United States Patent
Chesne

(10) Patent No.: US 6,736,381 B2
(45) Date of Patent: May 18, 2004

(54) SUSPENSION STOP DEVICE

(75) Inventor: Jean Chesne, Villaz (FR)

(73) Assignee: SNR Roulements, Annecy (FR)

( * ) Notice: Subject to any disclaimer, the term of this patent is extended or adjusted under 35 U.S.C. 154(b) by 0 days.

(21) Appl. No.: 10/296,218

(22) PCT Filed: Apr. 13, 2001

(86) PCT No.: PCT/FR01/01148

§ 371 (c)(1),
(2), (4) Date: Dec. 2, 2002

(87) PCT Pub. No.: WO01/92040

PCT Pub. Date: Dec. 6, 2001

(65) Prior Publication Data

US 2003/0137091 A1 Jul. 24, 2003

(30) Foreign Application Priority Data

May 30, 2000 (FR) .............................. 00/06886

(51) Int. Cl.⁷ .......................... B60G 15/06; B60G 15/07
(52) U.S. Cl. .......................... 267/220; 267/292; 267/33; 280/124.147; 280/124.155
(58) Field of Search ................................ 267/220, 292, 267/293, 294, 33, 141, 152, 153, 221, 170, 166, 179, 219; 188/322.12; 280/124.147, 124.155; 384/615, 607, 614

(56) References Cited

U.S. PATENT DOCUMENTS

| 5,467,971 A |   | 11/1995 | Hurtubise et al. |
| 6,182,953 B1 | * | 2/2001 | Smith et al. ................. 267/220 |
| 6,267,512 B1 | * | 7/2001 | Beghini et al. ............. 384/609 |
| 6,412,798 B2 | * | 7/2002 | De Fontenay et al. .................... 280/124.147 |
| 2003/0137091 A1 | * | 7/2003 | Chesne ........................ 267/292 |

FOREIGN PATENT DOCUMENTS

FR   2809675   * 12/2001

* cited by examiner

*Primary Examiner*—Douglas C. Butler
(74) *Attorney, Agent, or Firm*—Oblon, Spivak, McClelland, Maier & Neustadt, P.C.

(57) ABSTRACT

A suspension stop device, for a motor vehicle driving wheels, including a filtering block, having an upper housing fixed relative to the vehicle body and co-operating with a lower housing mobile in rotation about a shock absorber rod and supporting a suspension spring, and a ball bearing. The upper and lower housings are made of thermoplastic material and have opposite surfaces hollowed out in a circle, about the rotation axis of the shock absorber rod, to receive a raceway for the ball bearing. The upper housing further incorporates an impact stop molded around the leading stop of the shock absorbing device, and the thermoplastic structure of the upper housing is reinforced by a ring made of overmolded elastomer.

15 Claims, 3 Drawing Sheets

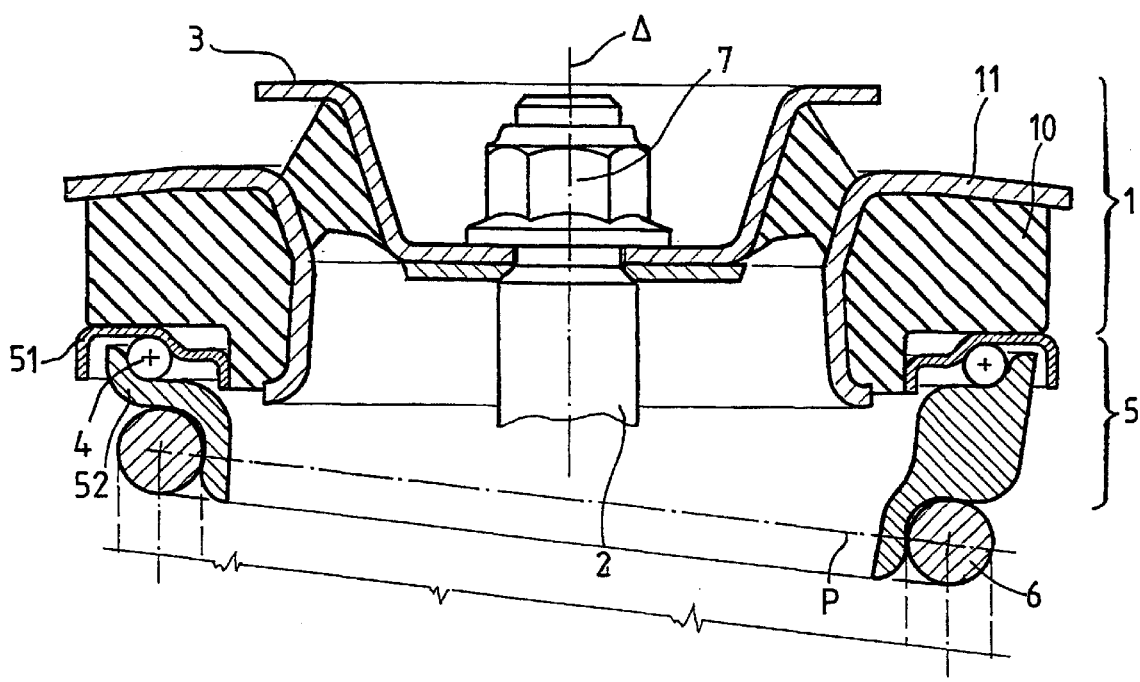
FIG_1
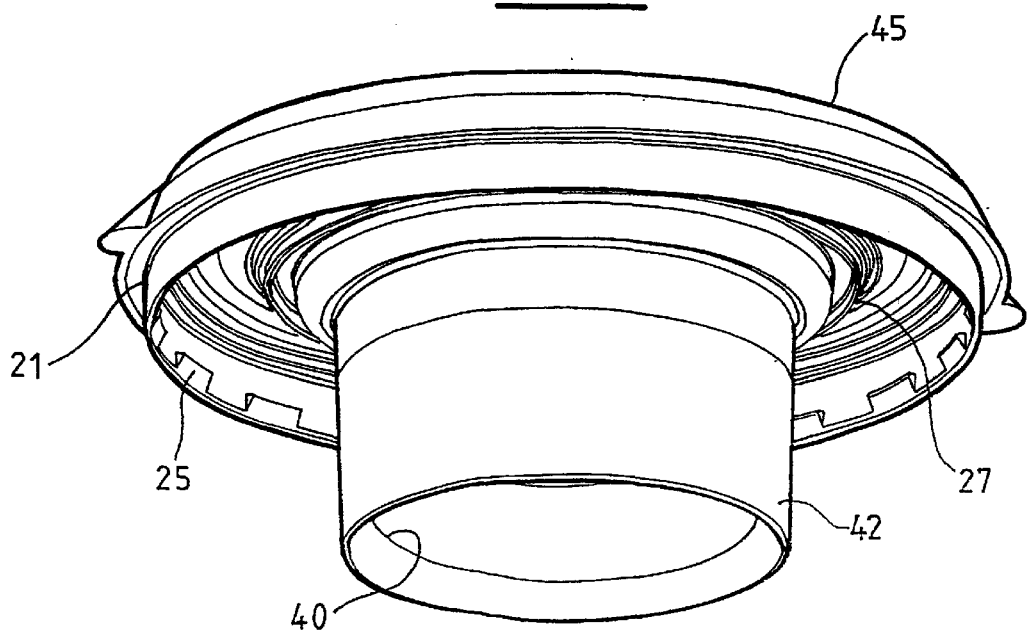
FIG_4

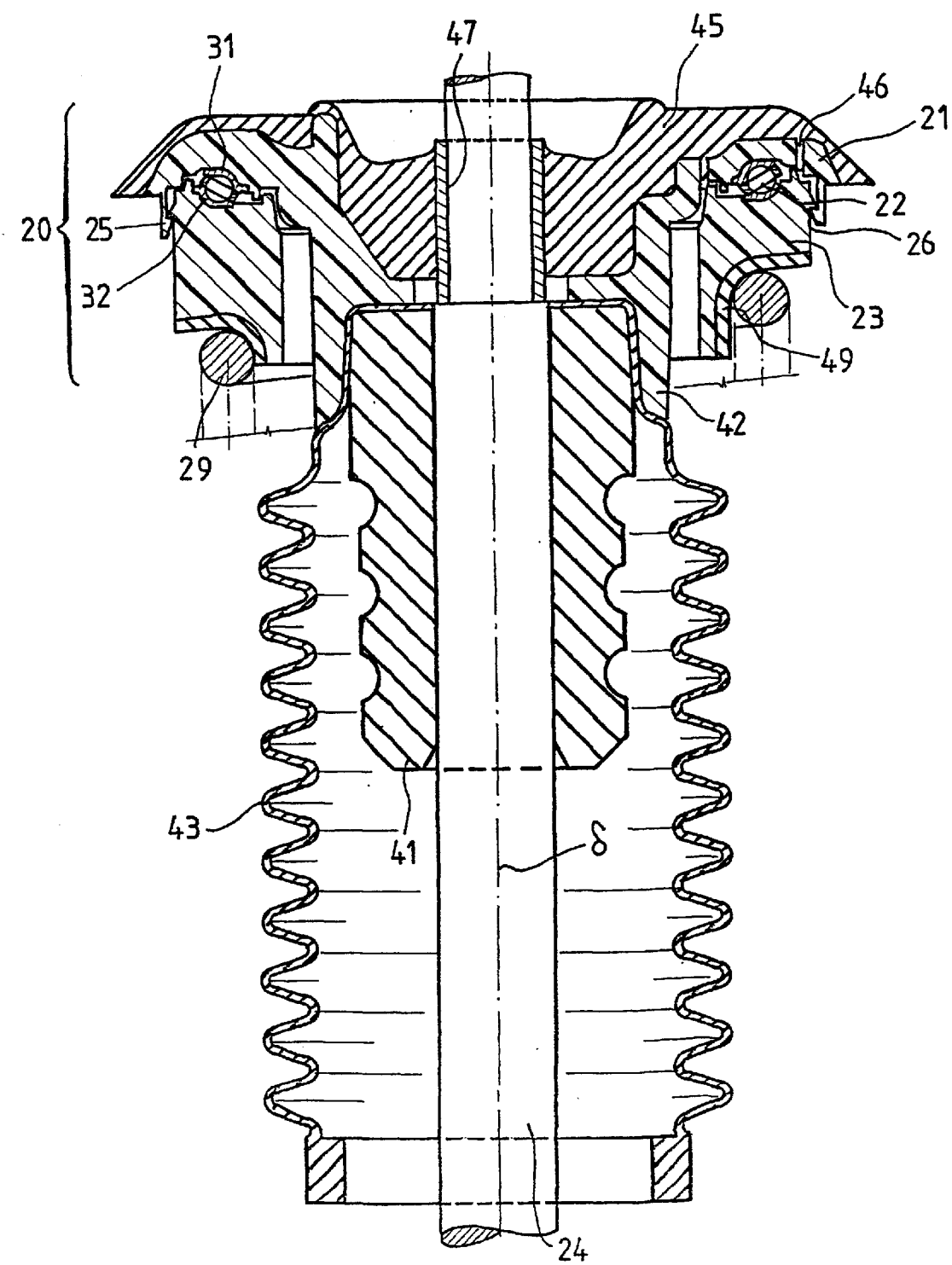
FIG_2

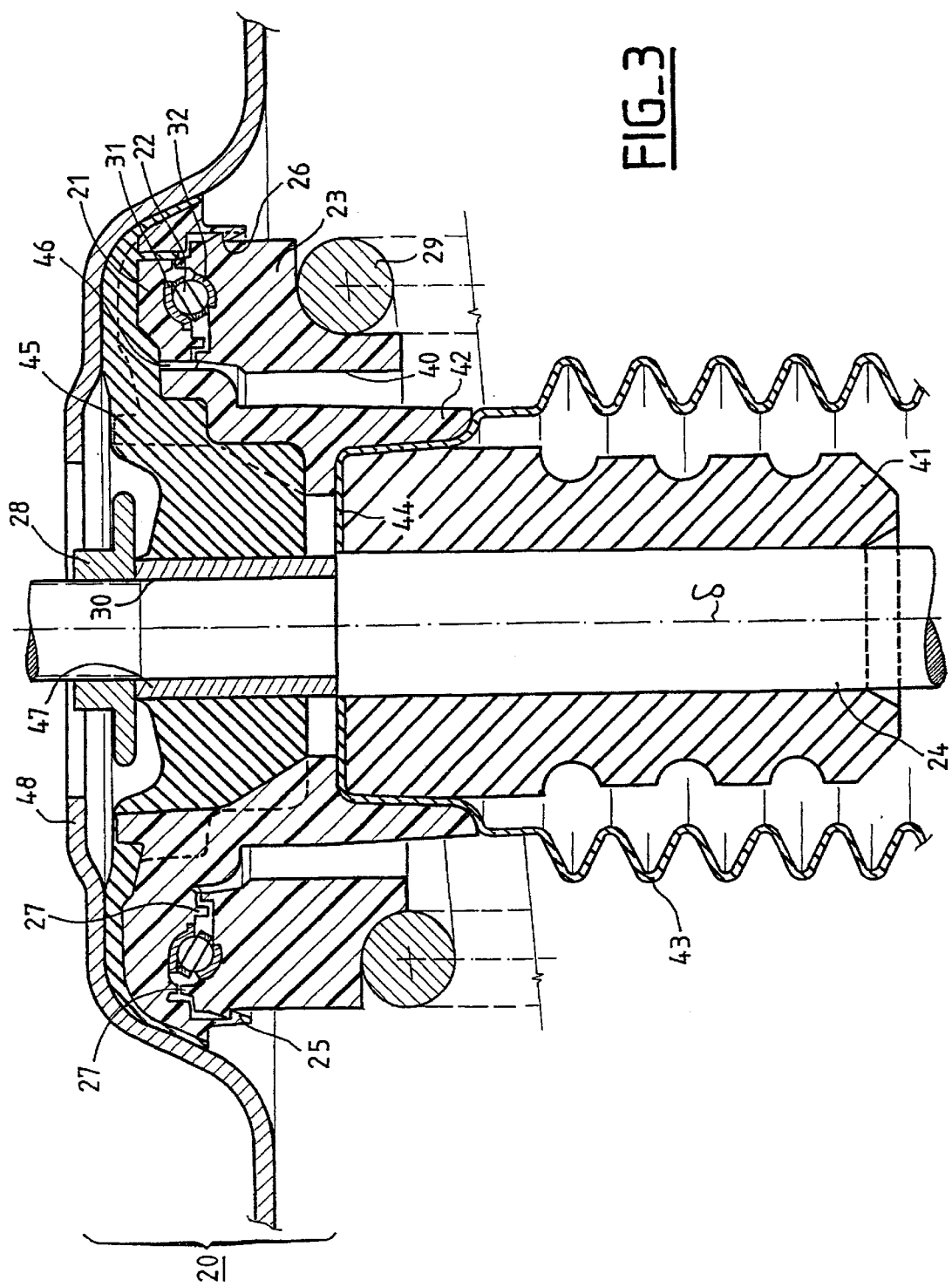
FIG_3

SUSPENSION STOP DEVICE

The present invention relates to a suspension stop device, intended in particular for suspension systems of the McPherson type for the steered wheels of a motor vehicle.

The suspension devices of motor vehicles generally contain a suspension-stop rolling bearing whose function is to transmit the axial and radial forces resulting from compression of the spring and at the same time to permit practically frictionless rotation between the spring and the vehicle body, this rotational movement of the spring taking place while the steered wheels are being turned and during variations of compression of the spring by a winding-up effect of the coils.

A current solution, whose view in axial section is illustrated in FIG. 1, generally contains two components, a suppression block 1, intended to suppress the movements of the shock-absorber rod 2 and of the spring 6 relative to the body 3 of the vehicle along the axis Δ of the rod, and a ball bearing 4, maintained in a housing 5, intended to transmit the displacements of spring 6 in a plane P.

Suppression block 1 is made of rubber 10 or elastomer, bonded to a sheet-metal frame 11. It is integral with body 3, with which it is in contact by a bolt or other means.

Ball bearing 4 is seated between two bearing rings 5 forming a housing, of steel, for example, upper ring 51 being fixed and integral with the vehicle, while lower ring 52 is rotationally movable. This lower ring 52 also functions as support for suspension spring 6 of the device.

Shock-absorber rod 2 is fixed to the suppression block by a nut 7.

This current structure of a suspension stop device has a fairly large number of parts of different nature, which must be manufactured then assembled, resulting in a relatively complex and expensive device.

The present invention proposes to replace the current structure of the metal suppression block to which the rubber is bonded by a thermoplastic structure that, in addition to suppressing vibrations and noise, performs the function of a ball-bearing housing and the function of a bump stop, thus reducing the number of parts of the suspension stop device and therefore its cost price.

For that purpose the object of the invention is a suspension stop device for the driving wheels of a motor vehicle, comprising on the one hand a suppression block composed of an upper case fixed relative to the vehicle body and cooperating with a lower case that can move rotationally around a shock-absorber rod and serving as support for a suspension spring, and on the other hand a ball bearing, characterized in that the said upper and lower cases are made of thermoplastic material and have opposite faces containing a circular hollow around the axis of rotation of the shock-absorber rod in order to receive a raceway in the ball bearing, the upper case also integrating a bump stop molded around the striking stop of the shock-absorbing device, and in that the thermoplastic structure of the upper case is reinforced by a crown of overmolded elastomer.

According to another characteristic, the two upper and lower cases of the suppression block are made of fiberglass-reinforced thermoplastic material.

Other characteristics and advantages of the invention will become apparent on reading the description of a practical example illustrated by the following figures, which are, in addition to the already described FIG. 1:

FIG. 2: a view in axial section of a suspension stop device according to the invention;

FIG. 3: a partial view in axial section of the suppression block of the device according to FIG. 2;

FIG. 4: a perspective view of the upper case of the suppression block according to the invention.

The different elements identified by like reference symbols in the different figures perform like functions in order to achieve like results.

As FIGS. 2 and 3 show, a suspension stop device for the steered wheels of a motor vehicle is composed of a suppression block 20 made of thermoplastic material of polyamide 6 type, which can be loaded with fibersglass to reinforce the structure. This suppression block is composed of an upper case 21 and lower case 23, whose opposite faces contain circular hollows in order to achieve the additional function of raceway for the ball bearing 22, seated between these two cases, which are solids of revolution around the axis δ of shock-absorber rod 24. It is possible to insert a metal raceway in two parts, an upper part 31 and a lower part 32, seated respectively against the opposite faces of the upper and lower cases, serving as a more rigid cage for the balls 22. This raceway can be of deep drawn sheet metal.

To maintain these two cases firmly together, one below the other, upper case 21 is provided with a plurality of clips or catches 25 on its periphery, cooperating with a groove 26 machined on the circumference of lower case 23.

Ball bearing 22 ensures that lower case 23 can rotate relative to upper case 21 by virtue of a lubricant in which the balls are immersed. To ensure that this lubricant does not flow out of the raceway and that dust or mud cannot contaminate the said raceway, the opposite faces of the two cases are each provided with at least one circular baffle 27 cooperating with that of the other case to form at least one seal.

Uppercase 21 of suppression block 20 is obviously provided with a central aperture 30, along the axis of shock absorber rod 24 and which has a diameter adjusted to that of the said rod around which it is placed.

Upper case 21 of the suppression block performs a third function, that of a bump stop, progressively blocking the penetration of the body of the shock absorber against a striking stop 41 when the shock absorber arrives at the end of its deflection. For this purpose, the upper case is provided with a molded base 42 which acts as a bump stop and whose bore, according to one embodiment, has a diameter larger than that of its upper part, so that it surrounds striking stop 41.

Lower case 23 of the suppression block also serves to support the upper end of suspension spring 29 of the device, and it is provided with an aperture 40 whose diameter is larger than that of aperture 30 of upper case 21 for the purpose of accommodating bump stop 42 of upper case 21. The support surface in contact with the spring can be covered with a sole 49 of elastomer.

A protective bellows 43 surrounds shock absorber rod 24 as well as striking stop 41, and its upper end 44 is wedged between the top of this striking stop and upper case 21.

To improve the suppression character of plastic block 20 assembled in this way, the plastic structure of upper case 21 is reinforced by a crown 45 of overmolded rubber or elastomer, provided with an axial bore adapted to the diameter of shock absorber rod 24. This crown advantageously suppresses vibrations and noise. It is fixed to plastic upper case 21 by bonding agent or adhesive.

In order to ensure leaktightness of the raceway of ball bearing 22, rubber crown 45 is provided with at least six wells 46, disposed in groups of two wells on three radii offset by 120°. These wells are designed to be seated in six channels drilled vertically in upper case 21 of suppression block 20 and thus to form two concentric sealing annuli.

These wells are overmolded at the same time as the crown, during manufacture thereof. In addition, these channels serve as anchoring points for the rubber crown on the upper part of upper case 21 of the suppression block.

FIG. 4 is a perspective view from below of thermoplastic upper case 21.

To maintain shock absorber rod 24 in the body 48 of the vehicle by a nut 28 tightened around its axis δ, it is necessary to place a cylindrical metal distance piece 47 along rod 24, between it and upper case 21 and rubber crown 45 of suppression block 20.

A suspension stop device designed according to the invention is composed of a reduced number of parts that can be easily made and assembled. The advantage of replacing a suppression block of rubber and sheet metal by rubber adhering to a thermoplastic structure is that the problems of corrosion are eliminated and the total weight of the device is reduced.

What is claimed is:

1. A suspension stop device for driving wheels of a motor vehicle, comprising:
   a suppression block composed of an upper case fixed relative to a body of the vehicle and cooperating with a lower case that can move rotationally around a shock-absorber rod and that serves as support for a suspension spring; and
   a ball bearing;
   wherein the upper and lower cases are made of thermoplastic material and have opposite faces containing a circular hollow around an axis of rotation of the shock-absorber rod to receive a raceway designed for the ball bearing, the upper case also integrating a bump stop molded around a striking stop of the shock-absorbing device, and wherein the thermoplastic structure of the upper case is reinforced by a crown of overmolded elastomer.

2. A suspension stop device according to claim 1, wherein the upper and lower cases of the suppression block are made of fiberglass-reinforced thermoplastic material.

3. A suspension stop device according to claim 2, wherein the upper case of the suppression block is provided with a plurality of clips on its periphery, configured to cooperate with a groove machined on a circumference of the lower case.

4. A suspension stop device according to claim 3, wherein the upper case of the suppression block is provided with a molded base that acts as the bump stop and whose bore has a diameter larger than that of its upper part surrounding the shock-absorber rod, so that the molded base surrounds the striking stop.

5. A suspension stop device according to claim 2, wherein the opposite faces of the upper and lower cases of the suppression block are each provided with at least one circular baffle cooperating to form at least one seal.

6. A suspension stop device according to claim 5, wherein the upper case of the suppression block is provided with a molded base that acts as the bump stop and whose bore has a diameter larger than that of its upper part surrounding the shock-absorber rod, so that the molded base surrounds the striking stop.

7. A suspension stop device according to claim 2, wherein the upper case of the suppression block is provided with a molded base that acts as the bump stop and whose bore has a diameter larger than that of its upper part surrounding the shock-absorber rod, so that the molded base surrounds the striking stop.

8. A suspension stop device according to claim 1, wherein the upper case of the suppression block is provided with a plurality of clips on its periphery, configured to cooperate with a groove machined on a circumference of the lower case.

9. A suspension stop device according to claim 8, wherein the upper case of the suppression block is provided with a molded base that acts as the bump stop and whose bore has a diameter larger than that of its upper part surrounding the shock-absorber rod, so that the molded base surrounds the striking stop.

10. A suspension stop device according to claim 1, wherein the opposite faces of the upper and lower cases of the suppression block are each provided with at least one circular baffle cooperating to form at least one seal.

11. A suspension stop device according to claim 10, wherein the upper case of the suppression block is provided with a molded base that acts as the bump stop and whose bore has a diameter larger than that of its upper part surrounding the shock-absorber rod, so that the molded base surrounds the striking stop.

12. A suspension stop device according to claim 1, wherein the upper case of the suppression block is provided with a molded base that acts as the bump stop and whose bore has a diameter larger than that of its upper part surrounding the shock-absorber rod, so that the molded base surrounds the striking stop.

13. A suspension stop device according to claim 1, wherein the crown of overmolded elastomer reinforcing the upper case of the suppression block is provided with at least six wells, disposed in groups of two wells on three radii offset by 120° configured to be seated in six channels drilled vertically in the upper case of thermoplastic material to form two concentric seals.

14. A suspension stop device according to claim 1, wherein a metal raceway is inserted between the upper and lower cases of the suppression block at a level of the circular hollows, the metal raceway being composed of two upper and lower parts seated respectively against the opposite faces of the upper and lower cases.

15. A suspension stop device according to claim 1, wherein a cylindrical metal distance piece is placed along the shock-absorber rod, between the shock-absorber rod and the upper case and the elastomeric crown of the suppression block, and wherein a nut is tightened around the axis of rotation of the shock-absorber rod to fix the upper case to the body of the vehicle.

* * * * *